(12) United States Patent
Liu et al.

(10) Patent No.: US 8,695,089 B2
(45) Date of Patent: Apr. 8, 2014

(54) METHOD AND SYSTEM FOR RESILIENT PACKET TRACEBACK IN WIRELESS MESH AND SENSOR NETWORKS

(75) Inventors: Zhen Liu, Tarrytown, NY (US); Hao Yang, Ossining, NY (US); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1618 days.

(21) Appl. No.: 11/694,388

(22) Filed: Mar. 30, 2007

(65) Prior Publication Data

US 2008/0244739 A1 Oct. 2, 2008

(51) Int. Cl.
*H04L 29/06* (2006.01)

(52) U.S. Cl.
USPC .................. 726/22; 726/23; 726/24; 713/189

(58) Field of Classification Search
USPC .................................. 713/153; 726/23, 25, 22
See application file for complete search history.

(56) References Cited

U.S. PATENT DOCUMENTS

| 5,455,865 | A | * | 10/1995 | Perlman | 713/153 |
| 5,479,514 | A | * | 12/1995 | Klonowski | 380/47 |
| 5,805,063 | A | | 9/1998 | Kackman | |
| 6,737,969 | B2 | | 5/2004 | Carlson et al. | |
| 7,058,796 | B2 | | 6/2006 | Lynn et al. | |
| 7,086,089 | B2 | | 8/2006 | Hrastar et al. | |
| 7,421,578 | B1 | * | 9/2008 | Huang et al. | 713/163 |
| 7,738,859 | B2 | * | 6/2010 | Roy et al. | 455/414.1 |
| 2003/0046388 | A1 | | 3/2003 | Milliken | |
| 2004/0093521 | A1 | * | 5/2004 | Hamadeh et al. | 713/201 |
| 2006/0184690 | A1 | | 8/2006 | Milliken | |
| 2006/0289647 | A1 | * | 12/2006 | Shafer | 235/451 |
| 2007/0153782 | A1 | * | 7/2007 | Fletcher et al. | 370/389 |

FOREIGN PATENT DOCUMENTS

| JP | 6501571 T | 2/1994 |
| JP | 7225550 A | 8/1995 |
| JP | 2006500842 T | 1/2006 |

OTHER PUBLICATIONS

Secure sensor network Routing: A clean-Slate Approach Bryan et al., 2006 ACM.*
Ye, F., Luo, H., Lu, S., & Zhang, L. (2004). Statistical En-Route Filtering of Injected False Data in Sensor Networks. IEEE, 839-850.*
Zhu, S., Setia, S., & Ning, P. (2004). An Interleaved Hop-by-Hop Authentication Scheme for Filtering of Injected False Data in Sensor Networks. IEEE.*
Adam M. Neiman, "Hash Stamp Marking Scheme for Packet Traceback", (Online), Oct. 14, 2005, pp. 1-71 University of Cincinnati, USA retrieved from the Internet.

(Continued)

*Primary Examiner* — Mohammad L Rahman
(74) *Attorney, Agent, or Firm* — Tutunjian & Bitetto, P.C.

(57) ABSTRACT

A system and method for packet traceback in a network includes maintaining an identity number (ID) for each node in a network and generating a signature (e.g., a message authentication code (MAC)) using a secret key shared between each node on a forwarding path and a sink. Each forwarding node leaves a mark by appending its ID and a signature in the packet, either in a deterministic manner or with a probability. Upon receiving a packet at the sink, correctness of the signatures included in each packet is verified in the reverse order by which these signatures were appended. A last valid MAC is determined in the forwarding path to determine the locations of compromised nodes that collude in false data injection attacks.

22 Claims, 10 Drawing Sheets

(56) References Cited

OTHER PUBLICATIONS

Harendra A. Alwis, et al. "A performance evaluation of Route Based Packet Marking (RBPM) for IP trace back", Multitopic Conference, School of Engineering and Information Technology, Deakin University, Dec. 1, 2006, pp. 364-369, Melbourne Australia.
Linfeng Zhang, et al., "TOPO: A Topology-aware Single Packet Attack Traceback Scheme", Securecomm and Workshops, Department of Electrical and Computer Engineering, Iowa State University, Aug. 1, 2006, pp. 1-10, Ames, Iowa, USA.
Adler et al.; Tradeoffs in Probabilistic Packet Marking for IP Traceback; ACM Symposium on Theory of Computing, 2002; 26 pages.
S. Bellovin; ICMP Traceback Messages; Internet Draft: draft-bellovin-itrace-oo.txt; 2000; pp. 1-7.
H. Burch et al.; Tracing Anonymous Packets to Their Approximate Source; USENIX Large Installation System Administratioin Conference; 2000; 10 pages.
D. Dean, et al.; An Algebraic Approach to IP Traceback; Network and Distributed System Security Symposium, 2001; 10 pages.
T. Doeppner, et al.; Using Router Stamping to Identify the Source of IP Packets; ACM Conference on Computer and Communications Security; 2000; pp. 184-189.
Dong, et al.; Efficient Probabilistic Packet Marking; IEEE International Conference on Network Protocols, 2005; 10 pages.
Karp, et al.; GPSR: Greedy Perimeter Stateless Routing for Wireless Networks; ACM MOBICO; 2000; 12 pages.
Kong, et al.; ANODR: ANonymous On Demand Routing with Untraceable Routes for Mobile Ad-hoc Networks; ACM MobiHoc, 2005; 12 pages.
Li, et al.; Large-Scale IP Traceback in High-Speed Internet: Practical Techniques and Theoretical Foundation; IEEE Symposium on Security and Privacy; 2004; 15 pages.
Madden, et al.; TinyDB: An Acquisitional Query Processing System for Sensor Networks; TODS; 2005; pp. 1-47.
Syverson, et al.; Anonymous Connections and Onion Routing; IEEE Journal on Selected Areas in Communications, IEEE; 1997; 11 pages.
Savage, et al.; Practical Network Support for IP Traceback; ACM SIGCOMM; 2000; 12 pages.
Snoeren, et al.; Hash-Based IP Traceback; ACM SIGCOMM; 2001; pp. 3-14.
Song, et al.; Advanced and Authenticated Marking Schemes for IP Traceback; IEEE Infocom, 2001; pp. 1-9.
Stone, et al.; CenterTrack: An IP Overlay Network f or Tracking DoS Floods; USENIX Security; 2000; 14 pages.
Yang, et al.; Toward resilient Security in Wireless Sensor Networks; ACM Mobihoc; 2005; 12 pages.
Ye, et al.; Statistical En-route Filtering of Injected False Data in Sensor Networks; IEEE Infocom; 2004; 12 pages.
Yu, et al.; Poster Abstract: A Dynamic En-route Scheme for Filtering False Data Injection in Wireless Sensor Networks; SenSys; 2005; San Diego, CA; pp. 294-295.
Zhang, et al.; Group Rekeying for Filtering False Data in Sensor Networks: A Predistribution and Local Collaboration-Based Approach; IEEE Infocom; 2005; 12 pages.
Zhu, et al.; An Interleaved Hop-by-Hop Authentication Scheme for Filtering of Injected False Data in Sensor Networks; IEEE Symposium on Security and Privacy; 2004; 13 pages.
Website Crossbow; xbow sensor networks; http://www.oxbow.com/; 2007; 13 pages.
Fukuda, N., et al., "Research and Development for Traceback System in Large-Scale Networks", The Institute of Electronics, Information and Communication Engineers. Mar. 2004. 2 pages.
Madden, S., et al., "TinyDB: An Acquisitional Query Processing System for Sensor Networks", ACM Transactions on Database Systems, vol. 30, No. 1. Mar. 2005. pp. 122-173.
Yamana, M., et al., Simulation of IP Traceback for the Denial of Service Attack—Simulation of IP Marking Traceback-, The Institute of Electronics, Information and Communication Engineers, vol. 104, No. 377. Oct. 2004, 11 pages.
Yamana, M., Simulation of IP Traceback for the Denial of Service Attack—Simulation of IP Marking Traceback-, The Institute of Electronics, Information and Communication Engineers, vol. 104, No. 173. Jul. 2004. 11 pages.
Yang, H., et al.,"Toward Resilient Security in Wireless Sensor Networks", The 6th ACM International Symposium on Mobile and Hoc Networking and Compution. May 2005. pp. 34-45.
Ye, F., et al., "Catching 'Moles' in Sensor Networks", 27th IEEE International Conference on Distributed Computing Systems. Mar. 2007. 9 pages.
Ye, F., et al., "Statistical En-Route Filtering of Injected False Data in Sensor Networks", IEEE Journal on A Selected Area in Communications, vol. 23, No. 4. Apr. 2005. pp. 839-850.

\* cited by examiner

Method 1 Algorithm for Locating Moles
1: // Initialization
   candidate mole set $S = \phi$, order relation Matrix $M$ is 0 x 0, node set $\Omega = \phi$, loop node set $\psi = \phi$
2: // subroutine for adding an upstream relation i→j into and update the relation matrix
   // 1 stands for $V_i$ is upstream to $V_j$, -1 vice versa, 0 is undecided, 2 is ambiguous
   AddLink (i,j) {
       if (M(i)[j] == -1)              //if $V_i$ has been showed downstream to $V_j$
           M[i][j] = M[j][i] = 2       // sets order between $V_i$, $V_j$ to be ambiguous
       else if (M[i][j] == 0 && M(j)[i] == 0)        // if the order is not decided
           M[i][j] = M[j][i] = -1;     // sets Vi to be upstream to $V_j$
       for each $k \in \Omega$         // recursively update the orders of $V_i$, $V_j$ to other nodes
           if (M (k)[i] == 1 || M (k)(i) == 2)    // if $V_k$ is upstream to $V_i$, $V_k$ is upstream to $V_j$
               AddLink (k,j);
           If (M (j)(k) == 1 || M[j](k) == 2)     // if $V_j$ is upstream to $V_k$, $V_i$ is upstream to $V_k$
               AddLink (i,k);
       end for
   }
3: // Given an order relation matrix M, identify nodes in a loop by identity swapping attacks
   Find Loop () {
       for each $V_i \in \Omega$
           for each $V_j \in \Omega$
               if(M[i][j] == 2)
                   $\psi = \psi \cup \{i,j\}$
   }
4: // Upon verification of k correct nested marks from nodes $\{V_{i1}, \rightarrow V_{i2} \rightarrow ... \rightarrow V_{ik}\}$.
   Incorrect marks are discarded.
   Process Packet () {
       If ($i_1 \notin \Omega$)
           $S = S \cup \{i_1\}$
       for each $i_j \notin \Omega$
           $\Omega = \Omega \cup \{i_j\}$
           add a new row and a new column for $i_j$ in M
           set all new elements in M to 0
       endfor
       for each link $V_{i_j} \rightarrow V_{i_{j+1}}$ s.t. $M_{i_j, i_{j+1}} \neq 1$        //update M to record $V_{i_j}$ is upstream to $V_{i_{j+1}}$
           Add Link ($i_j, i_{j+1}$);
       endfor
       for each $i \in S$, find if there $\exists V_j \in \Omega$ s.t. $M_{j,i} = 1$
           if so, $S = S - \{i\}$       // remove those nodes having upstream nodes
       end for
   }
   // continue on next page

FIG. 4A

```
// main procedure for locating moles
Main () }

// this ensures enough marks are received to reconstruct the route
    run Process Packet () for a sufficient number of received packets
    if(S = ϕ)        // if there exist nodes without upstream nodes
        S contains nodes whose one-hop neighborhood has moles
    else {
        run FindLoop() to remove nodes in the loop
        remove from M rows and columns corresponding to nodes in Ψ
    // Among nodes not in the loop, the most upstream one has moles in one-hop neighborhood
        find the most upstream nodes in M
    }
}
```

FIG. 4B

METHOD AND SYSTEM FOR RESILIENT PACKET TRACEBACK IN WIRELESS MESH AND SENSOR NETWORKS

BACKGROUND

1. Technical Field

The present invention relates to network communications and more particularly to systems and methods for traceback in networks to identify and prevent false data injection.

2. Description of the Related Art

Packet traceback is a technique to identify the true origin of a packet and the path it has traversed in a network. It is widely used to combat emerging denial of service (DoS) attacks, where the source address of attack packets is usually "forged" by the attackers to conceal their identities.

There have been a number of IP packet traceback schemes for the wired Internet. For example, a probabilistic packet marking (PPM) scheme has been proposed. In PPM schemes, with certain probability, a router "marks" some information into the packet that the router forwards. The information conveys the identity of the router, or the link between two adjacent routers. After collecting the markings from different routers, the destination can reconstruct the path which the packets have traversed.

An algebraic approach has been proposed where the path information is encoded in a polynomial, f(x), whose coefficients are determined by the identities of the routers along a path. Each packet carries a sample x, and all routers along a path will collectively compute f(x). After collecting sufficient (x, f(x)) value pairs, the destination can derive the coefficients and eventually infer the identities of routers.

In other techniques, each router is required to store the previously forwarded packets for an extended period of time. By querying the routers whether they forwarded one packet in the past, the destination can reconstruct the forwarding path. Routers may also send out-of-band traceback messages to the source or destination with small probability. Collecting these messages allows the destination to construct the path.

These schemes were designed under a limited threat model, which becomes insufficient in many applications, e.g., in wireless mesh and sensor networks. Most of these conventional techniques assume that the intermediate nodes (routers) are not compromised. This may not be true in reality, especially in wireless mesh or sensor networks, where the nodes are vulnerable to physical capture and compromise. In these schemes, even a single compromised intermediate node can prevent the true origin of packets from being identified. The compromised node can even forge the markings and trick the victim into tracing back to arbitrary incorrect origins.

In addition, many schemes require a large number of packets be collected, or intermediate nodes store large amounts of audit traces to accurately pinpoint the locations of perpetrators. These may not be an issue in the Internet, but face severe practical obstacles in wireless mesh and sensor networks, which have stringent bandwidth, energy, and storage resources.

SUMMARY

A system and method for packet traceback in a network includes maintaining an identity number (ID) for each node in a network and generating a signature, e.g., a message authentication code (MAC), attached to a packet at each forwarding node, in either a deterministic or a probabilistic manner, using a secret key shared between the forwarding node and a sink. Upon receiving a packet, the sink verifies the correctness of the signatures (MACs) in the packet in reverse order in which the signatures (MACs) were added. The first invalid signature (MAC) reveals a compromised node which has injected a forged report or tampered with a legitimate packet on-the-fly.

A method for packet traceback in a network includes maintaining an identity number (ID) for each node in a network, generating a signature at each forwarding node using a secret key shared between this node and a sink, upon receiving a packet at the sink, verifying correctness of the signatures of each packet by the sink in reverse order in which the signatures were added and determining signature validity in the forwarding path to determine a location of a false data injection source, and/or a colluding compromised node.

Another method for packet traceback in a wireless mesh or sensor network includes maintaining a real identity number (ID) for each node in a network, computing an anonymous ID from the real ID based on a secret key known only to a current node and a sink, generating a message authentication code (MAC) using the secret key for each node in a forwarding path to mark each packet with at least two probabilities, tracing back the path to discover false data injection sources by: determining the real ID from the anonymous ID for nodes in the network, reconstructing a node route using marks present in each packet, and verifying correctness of the MAC of each packet back through each node of the forwarding path using the real ID and the secret key to determine a last valid MAC in the forwarding path.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a pseudo-code listing (method 1) for implementing a program for traceback and mole detection in accordance with an illustrative embodiment where probabilistic marking is used;

DETAILED DESCRIPTION OF PREFERRED EMBODIMENTS

Figure 1:
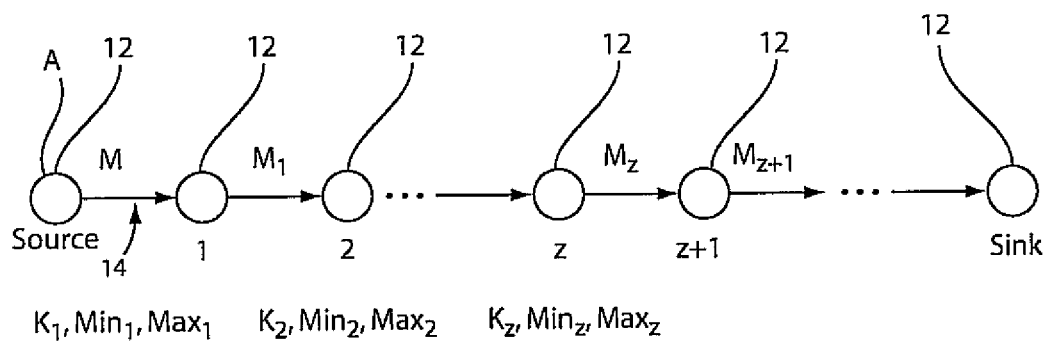
FIG. 1 is a diagram showing a forwarding path of nodes in a wireless network in accordance with one embodiment.

In accordance with present embodiments, systems and methods are provided that can accurately pinpoint the locations of perpetrator nodes in the presence of multiple, colluding perpetrators. The present embodiments are particularly applicable for wireless mesh and sensor networks, where the threat is more severe and resources are more stringent. In contrast with the prior art, the present embodiments work in the presence of not only compromised nodes but also compromised forwarding nodes and pinpoint their locations. This is more than adding authenticators to markings to prevent forged marks. Multiple, colluding compromised nodes can still trick the victim to trace to innocent nodes in prior art. In accordance with the present principles, resilient traceback is achieved using fewer resources, and traceback can be achieved to the perpetrator using only a single packet.

Many wireless sensor networks are expected to work in a possibly adverse or even hostile environment. Due to their unattended operations, it is easy for an adversary to physically pick up and compromise sensor nodes, obtaining their stored data including secret keys. These compromised "moles" can launch various types of attacks, an important one of which is false data injection. One single mole can inject large amounts of bogus traffic to flood the sink, leading to application failures and wasting energy and bandwidth resources along the forwarding path. Recent research has proposed a number of schemes to detect and drop such bogus messages en-route. However, they are all passive in that they only mitigate the damage of attacks. They do not provide active means for fighting back and eliminating the root cause of the attacks.

The following description addresses active fight-back, that is, how to locate moles in sensor networks. Knowing the moles locations, the moles can be isolated or removed from the network, thus eradicating the root cause of the attack. Locating moles presents a great research challenge. First, in contrast to the Internet where routers are better protected and more relatively trusted than end hosts, all sensor nodes in a sensor network are equally accessible by the adversary and uniformly un-protected. Any node can forward packets; there is no relatively trusted routing infrastructure that can be leveraged. Second, the moles can collude. The moles can not only share their secret keys, but also manipulate packets in a coordinated manner to cover up their traces. Such manipulation attacks are far more sophisticated than simply increasing the amount of bogus traffic. Existing Internet protocol (IP) traceback schemes for the Internet do not consider such colluding moles and become ineffective under such attacks.

In accordance with particularly useful embodiments, a nested marking scheme to locate colluding moles in false data injection attacks is presented. Packet marking is employed to deduce the true origin of packets: A node marks its identity in the packets it forwards. By collecting such marks, the sink can infer the route, and thus the origin locations of the traffic. Although packet marking has been used in the Internet, its applicability against colluding sensor moles, however, has never been studied to our knowledge. Existing marking schemes for IP traceback can be easily defeated by an intermediate colluding mole, which tampers the marks to hide the true locations of the source and itself, or even lead the sink to track to innocent nodes.

The present nested marking scheme supports single-packet traceback. Each forwarding node marks packets in a nested fashion such that its mark protects the marks of all previous forwarding nodes. It ensures that no matter how the colluding mole manipulates the marks, it either reveals the source's location, or that of its own.

The need for proactive security against moles in sensor networks is examined, within the framework of packet marking, for various colluding attacks that moles can launch. The security of packet marking includes that nested marking is both sufficient and necessary; if portions of marks of previous nodes are not protected (as in many seemingly obvious designs), there exist attacks where a colluding mole can either hide the locations of the source and itself, or trick the sink trace to innocent nodes. Nested marking's effectiveness is shown herein through analytical evaluations.

A Probabilistic Nested Marking (PNM) scheme in accordance with the present principles achieves secure and efficient traceback against colluding mole using two techniques, namely nested marking and probabilistic marking. Nested marking supports single-packet traceback. Each forwarding node marks packets in a nested fashion such that its mark protects the marks of all previous forwarding nodes. It ensures that no matter how a colluding mole manipulates the marks, it either reveals the source's location, or that of its own. Probabilistic marking reduces the per-packet overhead to suit the constrained resources of sensors. Each node leaves a mark with certain probability, thus a packet carries only a few marks. Different from Internet marking schemes where a new mark may replace an existing one, new marks are simply appended to the packet.

PNM's effectiveness and efficiency are demonstrated herein through both analytical and empirical evaluations. PNM has fast-traceback: within about 50 packets, the sink can locate a mole up to 20 hops away. It virtually prevents moles from launching effective data injection attacks as they will be caught before they can inject a meaningful amount of attack traffic.

A Probabilistic Nested Marking (PNM) system and method are provided that are secure against colluding attacks. No matter how colluding moles manipulate the marks, PNM can locate the moles one by one. The nested marking is both sufficient and needed to resist colluding attacks, PNM also has fast-traceback, e.g., within about 50 packets, it can track down a mole up to 20 hops away from a sink. This virtually prevents any effective data injection attack: moles will be caught before they have injected any meaningful amount of bogus traffic.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a network 10 includes a plurality of nodes 12. Some nodes 12 may be located is a forwarding path 14. Each node 12 can share a key (K) with a sink node (Sink) and maintain a monotonically increasing sequence number. When a source node (Source) A sends out message M, it appends its ID and sequence number, and then computes a signature (e.g., a message authentication code). The source sends the entire packet to a next hop node 1, and increments its sequence number. Similarly, node 1 appends its ID and sequence number, yet another signature to the packet, then passes the result to the next hop and increments its sequence number. Eventually the packet arrives at the sink node, Sink. The arriving packet includes the original message M, as well as the IDs, sequence numbers and signatures of all nodes on the path.

From the IDS in the packet, the sink node, Sink, knows the claimed path that the packet appears to have traversed. It verifies this path in reverse order, starting from the last hop node. For each node on the path, the sink uses the key shared with that node to recompute the signature and verifies if the signature in the packet is correct. The sink also verifies if the sequence number is valid. If both checks succeed, it continues to verify the previous hop. Eventually, the sink stops if it has verified all signatures/sequence numbers correctly, or stops at the first incorrect signature/sequence number. A perpetrator node is within the one-hop neighborhood of the node where the sink stops verification.

Because we compute signatures and they protect the message layer by layer in an "onion" fashion (one layer at a time), no node can forge or modify the message of previous hops without being detected. Because each packet carries a per-hop sequence number, a perpetrator cannot replay old legitimate traffic without being detected. When there are multiple colluding nodes, the location of the last perpetrator on the path is discovered first, then the second to last, and so on. As long as these nodes continue to inject bogus messages and manipulate the markings, their locations will be discovered one by one. In contrast, existing solutions either do not deal with compromised intermediate nodes, or lose protection when multiple compromised nodes collude.

In accordance with the present principles, a resilient traceback scheme is provided to defend against the colluding attacks launched by multiple compromised nodes. Each forwarding node uses a signature to protect its own mark, as well as the marks from all previous forwarding nodes, in a nested manner. This can traceback the location of compromised attacking node even if there are colluding nodes. In one embodiment, deterministic marking is employed. However, because every forwarding node leaves a mark in the packet, increased message and communication overhead may result when the network size becomes large. Therefore, in an alternate embodiment, a probabilistic nested marking (PNM) scheme is employed that can reduce the per-packet communication overhead to a constant level, yet preserve the security defense against colluding attacks.

In the PNM embodiment, each forwarding node marks the packet with a small probability p. As a result, on a forwarding path of n nodes, a packet only carries n*p marks on average, as opposed to simply n marks in the alternate nested marking scheme. Although seemingly a straightforward extension, it turns out to be more involved due to two issues.

First, the above straightforward probabilistic extension to the nested marking scheme may open a new security loophole. It may be vulnerable to selective dropping attacks, in which a compromised forwarding node can frame any innocent node between itself and the true source, by dropping a selective set of packets. To defeat such selective dropping attacks, anonymization techniques may be employed to conceal the node identities in their marks.

Second, each packet may carry only partial samplings of a complete path. A path reconstruction method is provided for the destination to reconstruct the path, using a small number of attacking packets. The destination can use the reconstructed path to identify the perpetrator nodes.

The present principles can provide a much stronger defense than the conventional marking schemes. The present embodiments can withstand various colluding attacks, including the sophisticated selective dropping attacks, launched by multiple compromised nodes colluding to cover up their traces. In preferred embodiments, the benefits include reduced communication overhead and improved scalability, which makes it applicable to medium-scale or even large-scale networks.

Referring again to. FIG. 1, consider the path A-1-2 . . . -Z-Z+1- . . . -Sink, in which A is the source. Each node 12 shares a key K with the sink, e.g., A has K_a, 2 has K_2, and so on. In addition, each node maintains a sequence number, which records the number of packets it has generated or forwarded so far. The sequence number is initially zero when the node 12 is deployed, and incremented by one whenever the node 12 sends out a packet.

Each node 12 also maintains a monotonically increasing packet sequence number. When A sends a message M, it appends its identity and sequence number, computes a signature (e.g., a keyed Message Authentication Code (MAC)), then sends the entire packet M to the next hop. Each hop similarly appends its own identity, sequence number and signature before it passes the packet to the next hop. When node A has a message M to send, it appends its identity A and its current sequence number (seqnum, then computes a signature that protects the whole message:

A->B: $M\_a=M|A|seqnum|H\_ka(M|A|seqnum)$ where $H\_ka(x)$ denotes computing a signature of x using Key $K\_a$, "|" denotes concatenation. This whole packet can be denoted as $M\_a$. A sends $M\_a$ to the next hop 1, then increments its sequence number seqnum. Node 1 performs similar operations and sends the following packet to node 2: 1->2: $M\_a|2|seqnum2|H\_k2(M\_a|2|seqnum2)$ and so on.

In general, for two consecutive nodes Z, Z+1 on the path, after Z sends Mz to Z+1, Z will send Mz+1 to its next hop as: $M_{Z+1}=M_z|Z+1|seqnumZ+1|H\_k_{z+1}(M_Z|Z+1|seqnumz+1)$. When the sink receives such a message, from the node IDs it can retrieve the claimed path that the packet appears to have traversed. It verifies this path in reverse order of appending the packets, starting from the last hop node.

Without loss of generality, consider the case in which the sink verifies node V. The sink has message $M_{Z+}1$ which is: $M_z|Z+1|seqnumz+1|H\_k_{z+1}(M_z|Z+1|seqnumz+1)$ . After retrieving the ID Z+1, the sink first checks whether the signature is correct using the knowledge of $K\_Z+1$. Then, it verifies whether the sequence number seqnum z+1 is correct. To do so, the sink maintains a sliding window of sequence numbers for each node. This is the deterministic marking embodiment.

Figure 2:
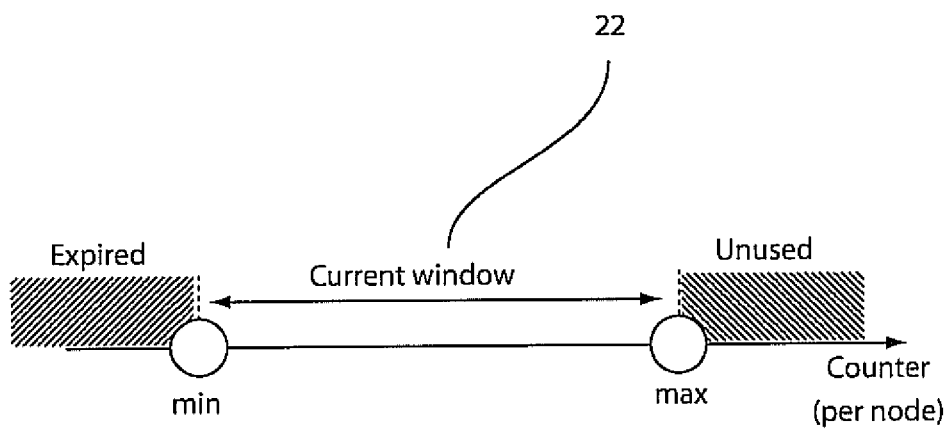
FIG. 2 is a diagram showing a bounded window of currently outstanding sequence numbers for determining whether a received packet's sequence number is within acceptable limits to verify that the packet is legitimate or a replay.

Referring to FIG. 2 with continued reference to FIG. 1, for each node 12, a current window 22 has an upper bound (max) and a lower bound (min). The upper bound (max) is the maximum sequence number that has been received from this node, and the lower bound (min) is the smallest sequence number that is still valid for this node. The window 22 maintains which valid and out-of-order sequence numbers are yet to be received. Each packet is assumed to have a maximum time to live in the network and this maximum lifetime (T_max) is used to update the window 22.

Initially, min and max are both 0 when the node 12 is deployed. When the sink receives a packet with a sequence number of d from this node, there are three possible cases: 1) d<min: the sequence number is invalid as it has already expired. 2) min≤d≤max: if d has not been received before, then it is valid and a mark is set for d, indicating that it has been used. The sink also updates min to the next smallest valid sequence number that has not been received. If d has been received (e.g., if d is marked), however, it is a replay, thus an invalid sequence number. 3) d>max: In this case, the sequence number is valid. Furthermore, the sink sets max=d, and start a timer associated with sequence number d. The timer will expire after T_max, which is the maximum lifetime of a packet inside the network. When this timer expires, the sink sets min=d, e.g., all packets with sequence number less than d should have died in the network.

A node on the path passes the sink verification if and only if its signature is correct and its sequence number is valid. In this case, the sink continues to verify the previous hop by retrieving the previous hop ID and verifies the signature and sequence number. Eventually the verification stops when all signatures/sequence numbers are correctly verified, or an incorrect signature/invalid sequence number is found. In either case, a compromised node is located within a one-hop neighborhood of where the sink stops. For example, when the sink has correctly verified all nodes, including the first hop $M|A|seqnuma|H(M|A|seqnuma)$. The real source is located within a one-hop neighborhood of node A. Alternatively, if at any hop, the signature or sequence number is invalid, a compromised node is within a one-hop neighborhood from the invalid node. For example, when verifying hop X: $M\_w|X|C\_x|H$. The sink finds that H does not match $H(M\_w|X|C\_x)$, it can be concluded that a compromised node is within a one-hop neighborhood of node X. That is, either X is the perpetrator (X forges a garbage H intentionally), or one of its neighbors such as Y is (e.g., Y modified X's signature H, but gave the correct signature for its own message).

The security protection offered includes many features. First, a perpetrator that tampers with legitimate traffic can be detected. Because the message is protected by the signature, layer by layer, a perpetrator that modifies a message will make the signature check of all previous hops fail, starting from the source to its immediate previous hop. Second, an attacker that tries to inject DoS attack packets cannot correctly forge remote origins because it does not have knowledge of the keys. The sink can follow the information left by normal nodes after the perpetrator to track down its location. Third, because the message is protected by a per-hop sequence number, a perpetrator cannot replay previous legitimate traffic, because it cannot produce correct signatures for incremented sequence numbers in old packets. Even when multiple attacking nodes collude on the same path, the location of the last perpetrator that modifies legitimate traffic or injects bogus traffic, will still be identified. The sink can further instruct other nodes not to communicate with the identified attacking nodes, and discover the rest of perpetrator nodes one by one.

Models and Assumptions: system and threat models are described, and a taxonomy of malicious attacks is presented within the packet marking framework.

Figure 3:
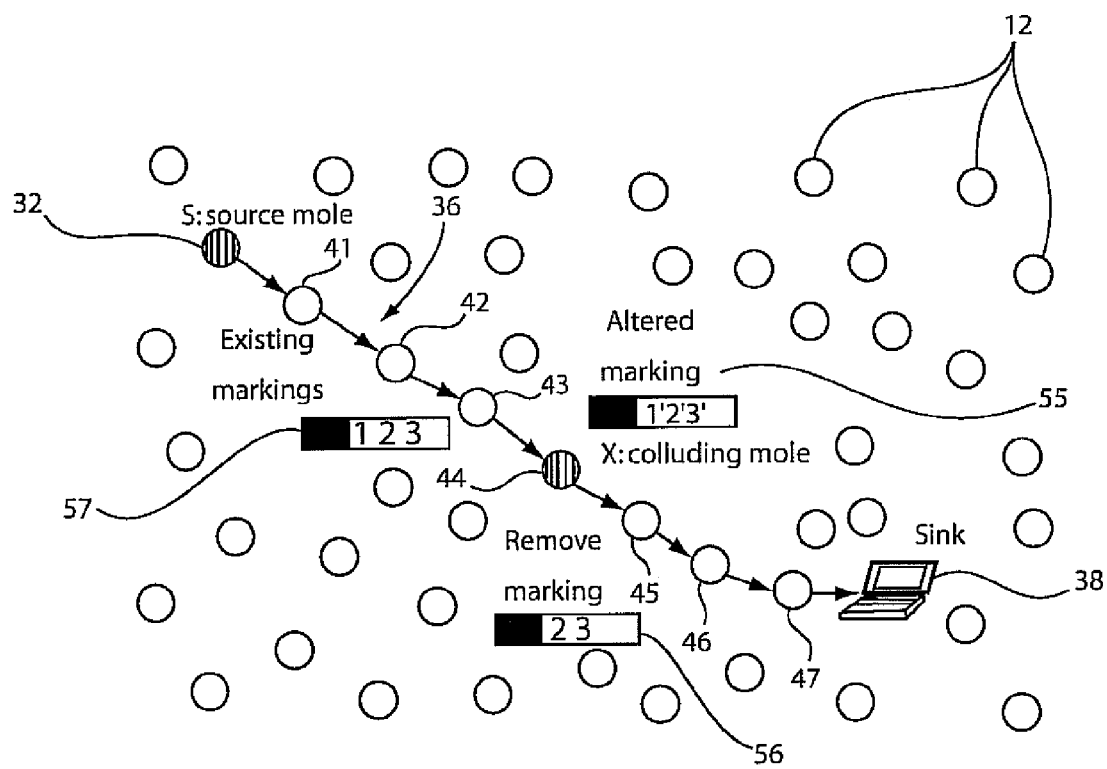
FIG. 3 shows an illustrative network having a forwarding path therethrough having collusive source and forwarding moles (e.g., compromised nodes), which are detected in accordance with the present principles.

Referring to FIG. 3, a system model is depicted for a static sensor network 30, which is considered where sensor nodes 12 do not move once deployed. These nodes 12 sense the nearby environment and produce reports about interested events, which include the time, location, description, etc. (e.g., sensor readings) of events. The reports are forwarded to a sink 38 by intermediate nodes 41-47 through multi-hop wireless channels. The sink 38 is a powerful machine with sufficient computing and energy resources. The routing is assumed to be relatively stable. Routes do not change frequently in short time periods. When routes are stable, each node 12 has only one next hop neighbor in a forwarding path 36 and forwards all packets to the sink 38 through this neighbor. This is consistent in any tree-based routing protocol or geographic routing protocols, which are known in the art.

Assume that each sensor node 12 has a unique ID and shares a unique secret key (K) with the sink 38. The ID and key can be pre-loaded into a node 12 before it is deployed. The sink 38 can maintain a lookup table for all node IDs and keys. While nodes may establish other keys for purposes such as neighbor authentication, PNM does not require such keys to work.

The sensor nodes 12 may be resource-constrained and have limited computational power, storage capacity and energy supply. For example, the known Mica2 motes are battery powered and equipped with only a 4 MHz processor and 256K memory. While public-key cryptography can be implemented in such low-end devices, it is too expensive in energy consumption. Thus, only efficient symmetric cryptography (e.g., secure hash functions) is considered for simplicity here.

In the present example scenario of FIG. 3, moles S (source 32) and X (forwarding path node 44) work together to cover their traces for injecting attack traffic, S injects bogus reports. X 44 receives a packet with, nodes 1, 2, 3 marks (57). X may manipulate the marks in various ways, such, as altering these marks to 1', 2', 3' (55), or removing the mark of node 1 (56). The moles' goal is to hide their locations, or lead the sink track to innocent nodes.

Threat Model and Attack Taxonomy: The adversary may compromise sensor nodes through physical capture or software bugs, thus gaining full control of them. The adversary has access to all the stored information, including secret keys, and can re-program them to behave in a malicious manner. Moles may coordinate to maximize the damage. The sink 38 is usually well protected. Although possible, compromised sinks are less likely and are not considered for simplicity.

The context for traceback is the threat of false data injection. One mole S 32 acts as a source and injects large amounts of bogus sensing reports into the network. Such reports not only disrupt the user application but also waste network resources (e.g., energy, bandwidth) spent in forwarding them. Traceback is the first step toward active defense. It permits the sink to identify the true origins of reports. The sink can then dispatch task forces to such locations, remove moles physically, or notify their neighbors not to forward traffic from them. The exact mechanism may vary, and the present focus is on traceback herein.

The challenge for an effective marking scheme is a colluding mole X 44 along the forwarding path may tamper with the marks arbitrarily. The mole X 44 can hide both its location and the source mole's (32) location, or even trick the sink trace to innocent nodes. Hiding the locations permits continuous injection without being caught or punished. This covertness is needed for the injection to cause significant damage. Leaking any of their locations will lead to punishment such as network isolation or physical removal. Tricking the sink trace to innocent nodes is an extra bonus wherein the sink punishes innocent nodes, thus cutting un-contaminated resources and effectively punishing itself. A taxonomy of colluding attacks against marking-based traceback by two colluding moles, S that injects bogus reports, and X on the forwarding path are provided as follows.

1) No-Mark Attacks: A mole may not mark the report at all. 2) Mark Insertion Attacks: Both the source mole and the forwarding mole may insert one or many faked marks into the reports. 3) Mark Removal Attacks: A forwarding mole may remove existing marks left by upstream nodes in the reports. 4) Mark Re-ordering Attacks: A forwarding mole may re-order existing marks in the reports. 5) Mark Altering Attacks: A forwarding mole may alter existing marks in the reports and make them invalid. 6) Selective Dropping Attacks: A forwarding mole may selectively drop those packets that, if received by the sink, would lead the traceback to them. 7) Identity Swapping Attacks: S and X may know each other's key and impersonate each other.

For example, FIG. 3 shows a chain of 7 forwarding nodes (41-47) between a source mole S 32 and the sink 38. Node X 44 is the colluding mole. Node 44 receives $V_3$'s message, which includes 3 valid marks 1, 2, 3, left by nodes $V_1, V_2, V_3$. Node 44 may alter these to 1', 2', 3', making them invalid, thus the sink rejects these marks. Node 44 may remove mark 1 and leave only 2, 3, thus the traceback stops at innocent nodes.

TABLE 1

| | |
|---|---|
| S | The source mole |
| M | Message generated by the source mole S. It contains event, location, timestamp. M = E/L/T |
| X | The colluding mole $V_x$ at hop X |
| $V_i$ | The forwarding nodes, at hop 1 to n |
| ki | The secret key shared between $V_i$ and the sink |
| $M_i$ | The message forwarded by node $V_i$ to its next hop neighbor $V_{i+1}$ |
| $m_i$ | The mark added by node i to $M_{i-1}$. It may include $V_i$'s ID and MAC |

To aid the presentation, Table 1 includes the notations employed hereinafter. A source mole S 32 injects bogus reports that conform to a legitimate format. Each report M includes an event E, location L and timestamp T (i.e., M=E/L/T, where "/", denotes concatenation). Reports cannot all include exactly the same content, otherwise they are considered redundant and be dropped by legitimate forwarding nodes. M is forwarded over a chain of n intermediate nodes $\{V_i\}$ (i=1, ..., n) to the sink 38.

Each node $V_i$ has a unicue ID i and shares a unique key $k_i$ with the sink. The node can use its key to generate a Message Authentication Code (MAC) or other signature for the packets it generates or forwards, using an efficient and secure keyed hash function $H_k(\ )$, where k is the key. Specifically, $V_i$ adds a mark $M_i$ to the message it receives from previous hop $V_{i-1}$ to construct its own message $M_i$. $m_i$ may include $V_i$'s ID i and MAC $MAC_i$. $V_i$ then sends $M_i$ to the next hop $V_{i+1}$.

Forwarding node $V_x$ (1<x<n) is a colluding mole and is denoted as X (44). X can manipulate the messages it receives from $V_{x-1}$ in an arbitrary manner, and then pass the message to $V_{x-1}$. Mole X can use any one or a combination of the attacks described above to hide the locations of S (32) and itself, or lead the traceback to innocent nodes.

Authenticate Marking Schemes (AMS) of the prior art fail to provide sufficient security because the mark added by a node does not protect its relation to marks left by previous nodes. Each mark can be individually manipulated without affecting the validity of other marks. The nested marking in accordance with the present principles establishes a binding between each mark and all previous marks, and probabilistic marking provides an additional feature, anonymity of IDs, to defeat selective dropping attacks.

PNM can locate colluding moles in false data injection attacks, within the precision of a single suspected neighborhood. This includes one node and its one-hop neighbors. A mole, either source or forwarding, is among them. PNM includes two techniques, namely nested marking and probabilistic nested marking. The nested marking is the basic mechanism. It ensures that the sink can trace back to a mole using only one packet. However, it has a drawback of large message overhead since each forwarding node needs to place a mark on the packet. In large sensor networks this might not be efficient.

Subsequently, probabilistic marking is employed to spread the message overhead over multiple packets. Each forwarding node places a mark with certain probability. Thus, a packet carries only a few marks and per-packet overhead is greatly reduced. This trades off detection power for less message overhead. The sink may need multiple packets to identify the moles, which is reasonable as long as the moles are identified before they cause significant damage.

Basic Nested Marking: Packet Marking: Each forwarding node $V_i$ appends to the packet its ID i and a secure MAC using the secret key $k_i$ it shares with the sink. The MAC protects the entire message it receives from $V_{i-1}$. That is, $MAC_i = H_{ki}(M_{i-1}/i)$ As an example, the messages sent by neighboring nodes are:

$$S \rightarrow V_1 : M$$

$$V_1 \rightarrow V_2: M_1 = M/1/H_{k1}(M/1)$$

$$V_2 \rightarrow V_3: M_2 = M_1/2/H_{k2}(M/2)$$

$$V_i \rightarrow V_{i+1}: M_i = M_i/i/H_{ki}(M_{i-1}/i).$$

At each hop, the ID i indicates node i's presence on the route, the MAC $H_{ki}(M_{i-1}/i)$ proves to the sink it is indeed node i that sends message $M_i$, and what the node receives was $M_{i-1}$. It can be seen that the MAC added by $V_i$ protects not only its own ID but the entire message from the previous hop. This is where the name of nested marking comes from. The MAC protects the IDs and MACs of all previous nodes, and their relative order. Any tampering with the previous IDs, or MACs, or their order, will make the MAC invalid.

Hereinafter formal security analysis will be employed to show that nested marking is sufficient and necessary for secure traceback. That is, it can withstand all colluding attacks, but any simpler design cannot. E.g., in extended AMS only the original message M and $V_i$'s ID are protected, but not the mark's binding to previous marks in $M_{i-1}$. This is why AMS fails when marks are individually manipulated.

Traceback: After receiving packet $M_n$, the sink verifies the nested marks backwards. It first retrieves the ID of the last hop n and uses the corresponding key $k_n$ to verify the last MAC $MAC_n$. If $MAC_n$ is correct, it retrieves the ID of the previous hop n−1 and verifies $MAC_{n-1}$. The sink continues this process until either it has verified all MACs as correct, or it finds an incorrect $MAC_x$. A mole (either source or forwarding) is located within the one-hop neighborhood of the node with the last verified MAC (including this node itself).

For example in FIG. 3, if mole X alters the mark of node 41, marks from nodes 41, 42 and 43 will all become invalid. When X does not leave a mark or leaves an invalid mark, the traceback stops at node 45 and a mole (X) is among the one-hop neighbors of this stopping nodes when X leaves a valid mark, the traceback stops at node X and the mole is this stopping node.

Probabilistic Nested Marking: Probabilistic Nested Marking lets each forwarding node mark the packet with a small probability p. Thus, on a forwarding path of n nodes, on average, a message carries np marks. The probability p can be tuned such that the overhead of np marks is acceptable.

An Incorrect Extension: Extending to a probabilistic marking may look straightforward at first glance. However, it turns out to be non-trivial. Simply letting each node mark with probability p (see the following) is vulnerable to selective dropping attacks that can lead the traceback to innocent nodes.

$S \rightarrow V_1 : M$ $V_1 \rightarrow V_2$ (with $p$): $M_1 = M/1/H_{k1}(M/1)$ $V_2 \rightarrow V_3$ (with $1-p$): $M_2 = M_1/2/H_{k2}(M/2)$ $V_i \rightarrow V_{i+1}$ (with $p$): $M_i = M_{i-1}/i/H_{ki}(M_{i-1}/i)$ $V_i \rightarrow V_{i+1}$ (with $1-p$): $M_i = M_{i-1}$. (1)

Consider the example in FIG. 3. Since the ID list is in plain text, the colluding mole X can see which of $V_1$, $V_2$, $V_3$ have marked the packet. Mole X can drop all packets including marks of $V_1$, and forward just those bearing S marks from $V_2$, $V_3$. When the sink traces back, it will stop at $V_2$, whose one-hop neighborhood does not include any mole. Actually, X can lead the traceback to any innocent node between itself and the source mole.

This attack works because in probabilistic marking, each packet carries only partial "samples" of nodes on the forwarding path. Due to the plain text ID, the mole can selectively pass certain "samples" so that the sink sees only a partial path ending at one of X's upstream nodes. This attack does not apply in the basic nested marking (deterministic marking) in accordance with the present principles, because every packet carries marks constituting the complete path. There exists no partial "samples" for selective dropping.

To defeat selective dropping attacks, it is desirable that no forwarding node is able to tell which other nodes have marked a packet. In this way, the colluding mole cannot know which packets to drop. However, the sink still needs to find out who has left marks to verify the marks. In the following description, asymmetry of the sink is exploited, which give additional information about all secret keys and sufficient computing resources, to solve the problem.

Probabilistic Nested Marking: Instead of using its real ID i, a legitimate node $V_i$ uses an anonymous ID i' in the packet. The mapping from real ID i to anonymous ID i' depends on the secret $k_i$, known by only $V_i$ and the sink. The colluding mole does not possess the knowledge of $k_i$ from uncompromised $V_i$, thus it cannot deduce the real ID from the anonymous one.

$S \rightarrow V_1 : M$ $V_1 \rightarrow V_2$ (with $p$): $M_1 = M/1'/H_{k1}(M/1')$, (where $1' = H'_{k1}(M/1)$)

$V_1 \rightarrow V_2$ (with $1-p$): $M_1 = M \ldots$ $V_i \rightarrow V_{i+1}$ (with $p$): $M_i = M_{i-1}/i'/H_{ki}(M_{i-1}/i')$ where $i' = H'_{ki}(M|i)$ $V_i \rightarrow V_{i+1}$ (with $1-p$): $M_i = M_{i-1}$. (2)

In the above, $H'( )$ is another secure one-way function that computes the anonymous ID. The anonymous ID i' is bound to M such that it changes for each distinct message $V_i$ forwards. (Remember that to avoid being considered as redundant copies and dropped, reports forged by the source mole should have different content.) This avoids a static mapping that can be accumulated over time by the attacker. Compared to the extended AMS, it has both nested marking and anonymous ID.

Mark Verification: With the anonymous ID, the verification at the sink becomes different. The sink first needs to know the real ID, then the sink can use the corresponding secret key to verify the MAC. The abundant computing power at the sink can be exploited to use an exhaustive search to find the real ID.

After receiving $M_n$ from node $V_n$, the sink first computes all the anonymous IDs for every node in the network. Knowing M, it can build a table to map all IDs i to i'. By looking up i', it knows the real ID i. Then, it can use the corresponding key $k_i$ to verify the MAC. In this way, the sink can verify all MACs one by one. The exhaustive search is feasible given the sink's computing power and the low data rate in sensor networks. For each distinct message M, the sink needs to compute a different table to do the lookup. Given that a hash computation can be done at the microsecond level (e.g., a 1.6 G CPU can do 2.5 million hashes per second), building such a table for even a reasonably large network (e.g., a few thousand nodes) should take on the order of a few milliseconds. Thus, the sink can verify several hundred or more packets per second. Because the sink receives from one sensor at a time, the incoming data rate is limited by a radio rate of sensors. Several hundred packets is already much higher than the current actual data rate on typical sensor hardware (e.g., 12 kbps for Mica2 motes, under 100 packets per second).

Traceback: Locating moles becomes a two-step process. First, the sink needs to reconstruct the route by collecting marks from a sufficient number of packets (the number of nodes to be analyzed will be addressed below). Then, it identifies which nodes have moles in their one-hop neighborhood.

An illustrative method 1 is provided in pseudo code and describes how the sink can locate moles in FIG. 4.

Figure 5:
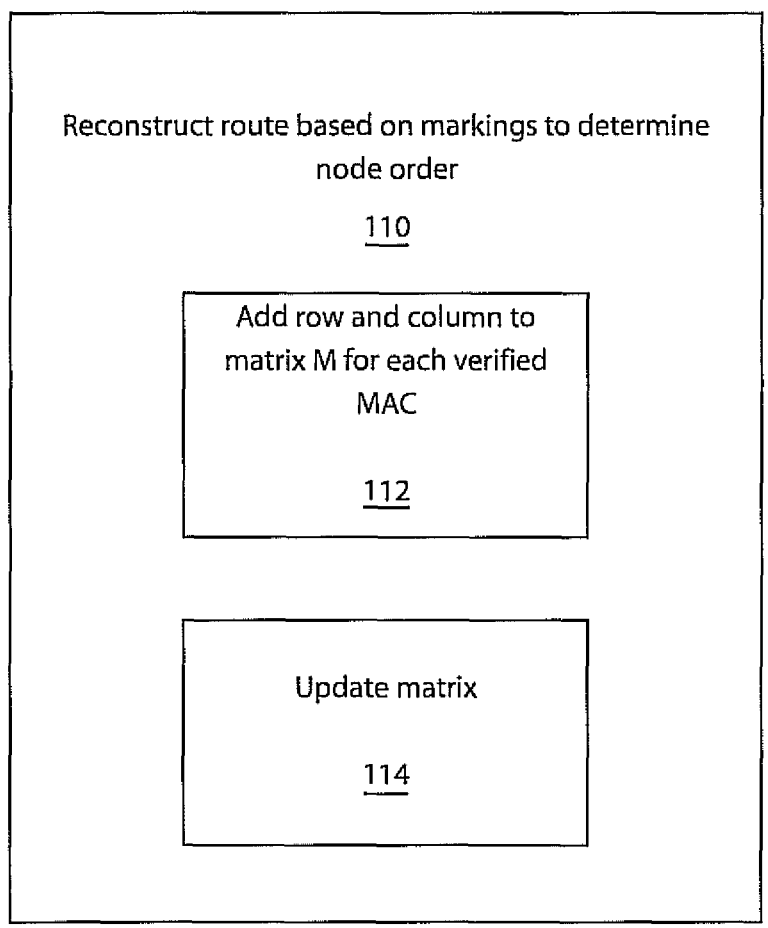
FIG. 5 is a block/flow diagram showing an illustrative way to reconstruct node order in accordance with the present principles.

Referring to FIG. 5, a block/flow diagram describes a system/method for locating moles in accordance with one embodiment. A route can be reconstructed by finding the relative order of nodes (which is upstream to which) in the forwarding path. In block 110, a route is reconstructed by determining all of its upstream nodes. A matrix M in employed to maintain the relative orders. The matrix is initially empty. When a correct MAC for a new node $V_i$ is verified, one more row and one more column corresponding to $V_i$ is added to the matrix in block 112. Whenever two consecutive MACs, $MAC_i$, $MAC_j$ within one packet are verified as correct, $V_i$ should be upstream to $V_j$, and M[i,j] records this relation (e.g., i,j is set to 1. −1 means $V_j$ is upstream to Vi, and 0 is undetermined) in the matrix in block 114. Since there is more than one node on the forwarding path, multiple nodes may have marked the packet when they flip the coin with probability p (see equation 2). These nodes may not be a continuous segment on the path, they can be disjoint on the forwarding path. As more packets are received, the sink keeps updating this matrix. Given sufficient packets, the sink will be able to find out the upstream relation among all forwarding nodes, thus the complete route.

The sink will be able to reconstruct two types of routes: those that do not have loops, or those have loops. The first type happens when moles use attacks other than identity swapping, the latter when moles swap their identities to leave marks. In the first case, locating moles is equivalent to finding the most upstream node. Because a source mole produces packets by itself, it does not receive packets from others and it can be the most upstream node. A forwarding mole may "appear" to be the most upstream, if it removes marks left by its upstream nodes. In either case, a source or forwarding mole is within the one-hop neighborhood of the most upstream node.

The moles may use identity swapping to create loops (see FIG. 6), thus there does not exist a "most" upstream node.

Figure 6:
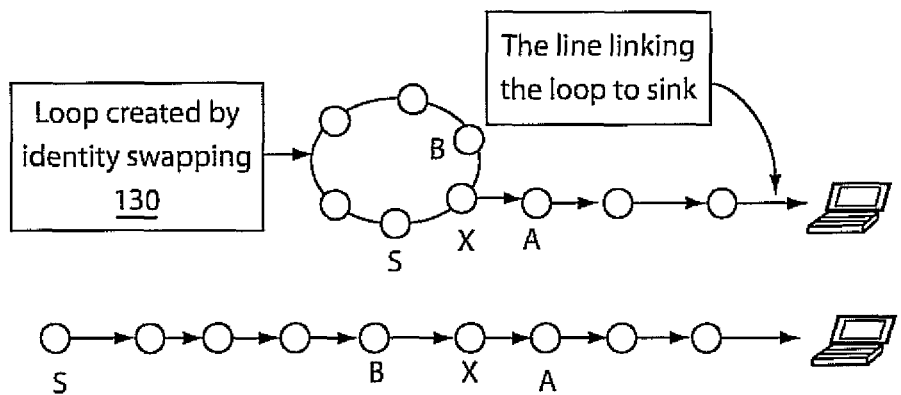
FIG. 6 shows a loop created by identity swapping which is detectable in accordance with the present principles.

Referring to FIG. 6, S and X can use each other's key to leave valid marks for some packets, thus causing a loop including all nodes between S and X (including these nodes) when the sink reconstructs the upstream relation among nodes. The sink can still traceback to where the loop breaks to the link and identify a mole within that neighborhood.

A source mole S and a forwarding mole X may leave valid marks using the key of each other for some packets, and use their own keys for some other packets. The sink will find that S appears before X for some packets, and after X for other packets. The sink will also find that all nodes between S and X (including S and X) form a loop 130. For any two nodes U, V in such a loop, U appears both upstream and downstream to V.

However, this anomaly can be easily identified; the sink can find the rest of the nodes form a line from the loop to itself. A mole is located within the one-hop neighborhood of the most upstream node in this line (i.e., where the loop intersects with the line).

Security Analysis: security strength of PNM is compared to alternative marking schemes. The analysis shows that nested marking is both precise and needed. PMN can track down moles to within one-hop neighborhood area despite colluding attacks, but any simpler design fails under certain attacks. The probabilistic nested marking can track down moles within one-hop neighborhood area asymptotically as the sink receives sufficient number of packets over time.

Security of Nested Marking: Two properties for marking schemes are first defined, namely one-hop precision and consecutive traceability, and then it is proved that they are equivalent. Then it is proved that our basic nested marking scheme is one-hop precise by showing its consecutive traceability.

Definition 1 (One-hop precision): A marking scheme has one-hop precision in traceback if it can always trace to either the source node's or a colluding mole's one-hop neighborhood.

Definition 2 (Consecutive Traceability): Consider two consecutive legitimate nodes U and V on a forwarding path (i.e., V receives messages from U and then forwards them). With a consecutive traceable marking scheme, if the sink has traced to V, it can always further trace to U.

Theorem 1: A marking scheme is one-hop precise if and only if it is consecutive traceable.

Sufficiency Proof: Suppose that the traceback stops at a node V, which is the last node (in the reverse order of forwarding) that has a valid MAC. V cannot be a legitimate node that is not on the forwarding path, because such nodes will not generate MACs for messages they do not forward, and the attacker does not know their secret keys. Thus, V is either a mole, or a legitimate node on the forwarding path. If V is a mole, the sufficiency holds. Next, the case where V is a legitimate forwarding node is considered.

Let U be the previous hop of V, i.e., V receives messages from U. There are only two possibilities: either U is a mole (source or colluding) or U is a legitimate node. In the first case, the sufficiency holds because V is in the neighborhood of a mole U. On the other hand, by definition of consecutive traceability, the traceback will proceed to U and will not stop at V. Thus, the second case cannot happen. This concludes the proof of sufficiency.

Next, necessity is proved by contradiction. Suppose a marking scheme is not consecutive traceable. That is, there exist cases when the sink has traced to a legitimate node V, but it cannot proceed to the previous legitimate node U. Thus, the traceback stops at V, not necessarily the neighborhood of the source or a colluding mole. The scheme is not one-hop precise by definition.

Figure 7:
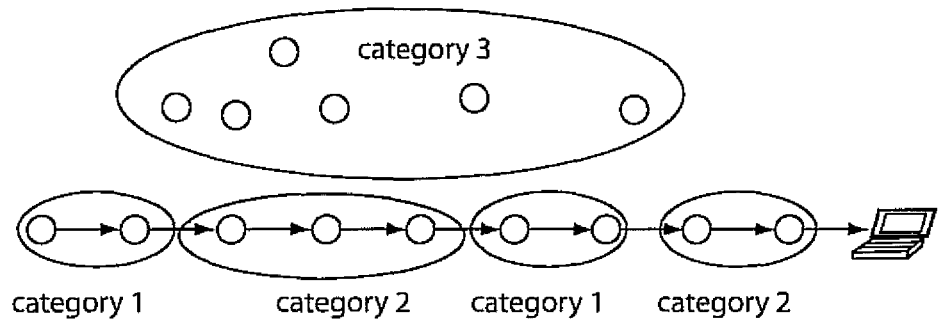
FIG. 7 is a diagram showing three categories of nodes.

Referring to FIG. 7, there are two categories of nodes on the forwarding path. Category 1: moles and their immediate next hop; Category 2: legitimate nodes that have immediate previous hop legitimate neighbor. Due to consecutive traceability, the traceback cannot stop in category 2. For category 3 nodes (legitimate nodes not on the forwarding path), they do not leave marks for the message they do not forward. Thus, the traceback can stop only in category 1 nodes.

One-hop precision means the traceback stops within the first category; consecutive traceability means the traceback cannot stop within the second category—that is, it has to stop within the first one.

Theorem 2: The nested marking scheme is consecutive traceable.

Proof: Consider two consecutive legitimate forwarding nodes U and V. Let $M_u$ be the message that U sends to V, and V sends $M_u/V/H_{kv}(M_u/V)$ to the next hop. Suppose the sink has traced to V. This means that it should have verified $MAC'_V$ in a message $M'_u/V/MAC'_V$, and found that the recomputed $MAC(H_{kv}(M'_u/V))$ is the same as the included $MAC'_V$. Because the attacker does not know kv, $MAC'_V$ must be the $MAC_V$ generated by V. Thus $M'_u$ and $M_u$ must be the same; otherwise, the recomputed MAC would not match that produced by V. Because $M_u$ is sent by a legitimate node U, the last mark in $M_u$ must carry a valid MAC from U. Therefore, by verifying this MAC, the sink can further trace to U.

Corollary 1: The nested marking scheme is one-hop precise.

Necessity of Nested Marking:

Theorem 3: Any marking scheme that protects less fields than the nested marking is not consecutive traceable.

Proof: In the nested marking, a node's MAC protects both its own ID and the entire message it receives from the previous hop. Now, consider an alternative marking scheme r, in which the MAC protects fewer fields than the nested MAC. There must exist a node A, whose ID or MAC is not completely protected by all nodes after it; otherwise, r would become the nested marking scheme.

Figure 8:
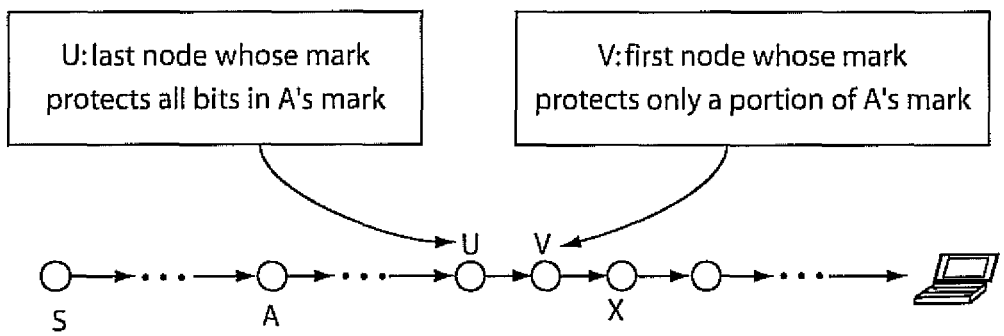
FIG. 8 is a diagram showing a last node with valid MACs in a forwarding path.

Referring to FIG. 8, X alters the bits in A's mark not protected by V. Thus the V's mark is still correct, but not U's. Then, the sink traces back to V, but cannot further trace to U. Let U be the last node that protects A's ID and MAC completely, and V be the next hop of U (See FIG. 8). That is, there are some bits in A's mark not protected by V's MAC. Let us consider one mole downstream after V. The mole properly marks the report, and it alters the bits in A's mark not protected by V's MAC. In this case, the MACs of all nodes after V (including V) are correct, thus the sink can trace to V. However, because A's mark is tampered by the mole, U's MAC would appear invalid, thus the sink cannot further trace to U. In other words, r is not consecutive traceable.

Corollary 2: Any marking scheme that protects less fields than the nested marking is not one-hop precise.

Security of Probabilistic Nested Marking:

Theorem 4: The probabilistic nested marking is asymptotically one-hop precise.

Proof: There are two possible cases when the sink reconstructs the upstream relation among nodes: either there are no loops, or there are loops. When there are no loops, the proof is similar to that of Theorem 2. Let us consider two consecutive legitimate nodes U, V on the forwarding path. Due to the probabilistic marking, these two nodes may not always both leave marks in the packet. However, with enough number of packets, the probability that they do not both leave marks in the same packet, $(1-p)^{2n}$, becomes smaller and smaller as the number of packets n increases. Asymptotically, there will be packets where both U, V leave marks. A forwarding mole might be able to drop such packets. However, because of the use of anonymous IDs, it cannot always correctly guess and drop all such packets. Asymptotically, the sink will receive packets with marks from both U and V. Following similar reasoning in Theorem 2, once the sink has traced to V, it can further trace to U. Thus, the traceback will not stop at V. So the traceback has to stop at the most upstream node, which has moles within its one-hop neighborhood (including this node itself).

When there are loops, we prove that the joining point (node X) of the loop and the line (see FIG. 6) have moles within its one-hop neighborhood (including this node itself) by contradiction. Suppose all the 4 nodes within this one-hop neighborhood (X, S, A, B) are legitimate nodes. Because packets arrive at the sink from X to A, A must be the next hop neighbor on X's forwarding path. Because the loop also represents upstream relation among nodes, X must also forward packets to one of its neighbors on the loop (S or B). Thus X has two next hop neighbors on its forwarding path. However, any legitimate node should have only one next hop neighbor on its forwarding path when routes are stable. Thus, these 4 nodes cannot all be legitimate nodes and one of them must be a mole.

The intuition behind this proof is that there must be some abnormal behavior around where the loop connects to the line. For legitimate nodes, they do not form loops when routes are stable. Thus, such abnormal behavior can only be explained by the presence of moles. Note that moles may launch an identity swapping attack in the basic nested marking, but since all nodes leave marks in each packet, the sink does not need to traceback through the upstream relationship and it can always trace back directly to moles.

Figure 9:
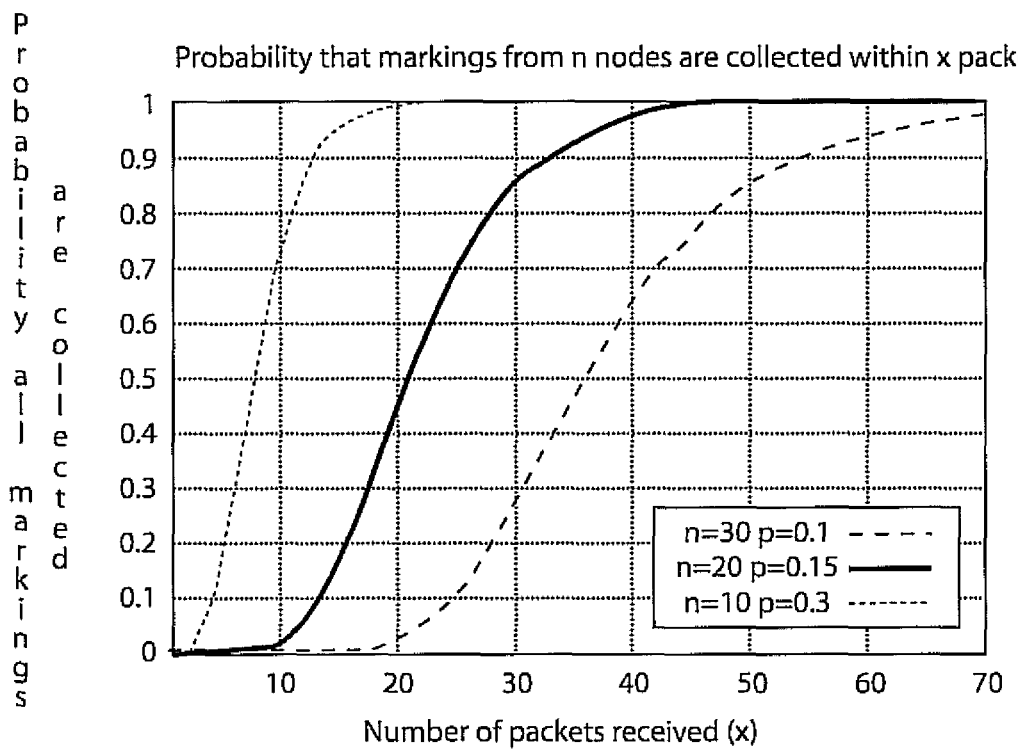
FIG. 9 is a graph showing analytical results of the probability that marks from all n forwarding nodes are collected after a sink receives x packets.

Performance Evaluation:

Analyze N, the number of packets needed for the sink to collect at least one mark from each of the forwarding nodes $V_i, \ldots V_n$. We can compute the probability that this is done within L packets, $P(N \leq L) = (1-1-p)^L)^n$ Referring to FIG. 9, a graph illustrates the probability that at least one mark from n nodes are collected within x packets. The average number of marks np a packet carries is fixed at 3. For a path containing 10 nodes, after receiving 13 packets, the sink has about 90% probability of having collected all marks. It takes 33 and 54 packets to achieve the 90% confidence for paths of 20 and 30 hops, respectively. The results show after a relatively small number of packets, which have not wasted significant energy and bandwidth resources, the sink will have collected marks from all nodes.

Figure 10:
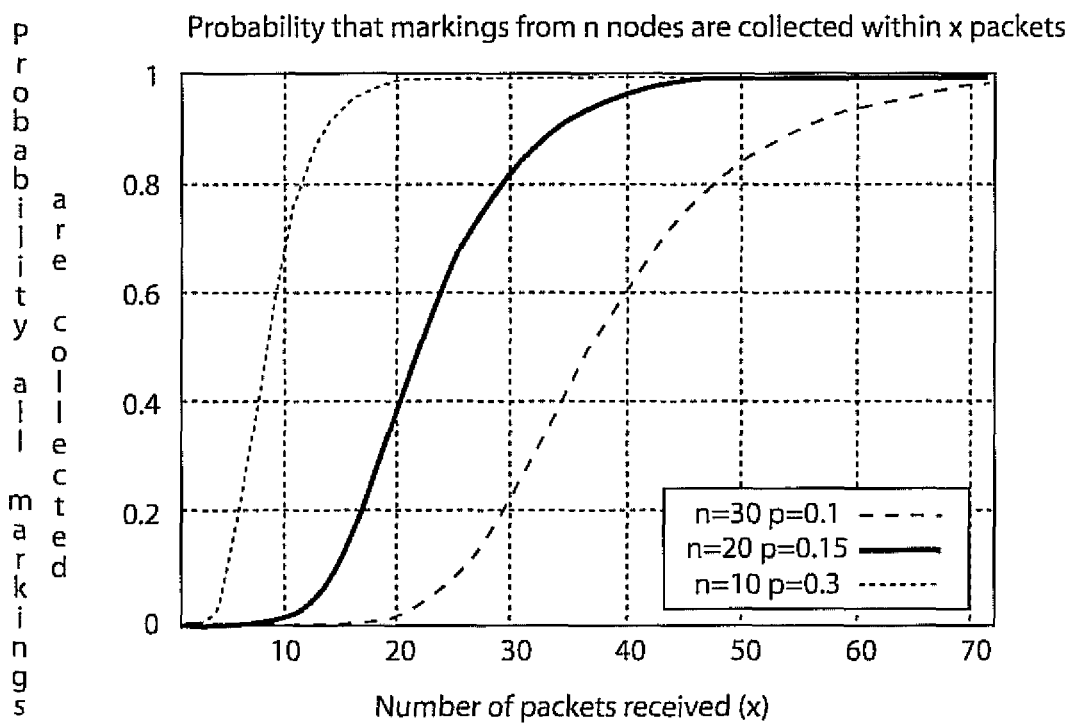
FIG. 10 is a graph showing simulation results of the probability that marks from all n forwarding nodes are collected after a sink receives x packets.

Simulation Results:

Referring to FIG. 10, simulations were run to verify the analysis and further evaluate metrics that are difficult to analyze. The probability p is tuned for different path lengths n such at a packet carries 3 marks on average. The analysis results were first verified. The number of nodes n was set to 10, 20, 30. 200 packets are generated from the source in each run and we averaged the results over 5000 runs. The probability that marks from all nodes are collected after the sink receives x packets is shown in FIG. 10. This result matches that of the analysis of FIG. 9 very well.

Figure 11:
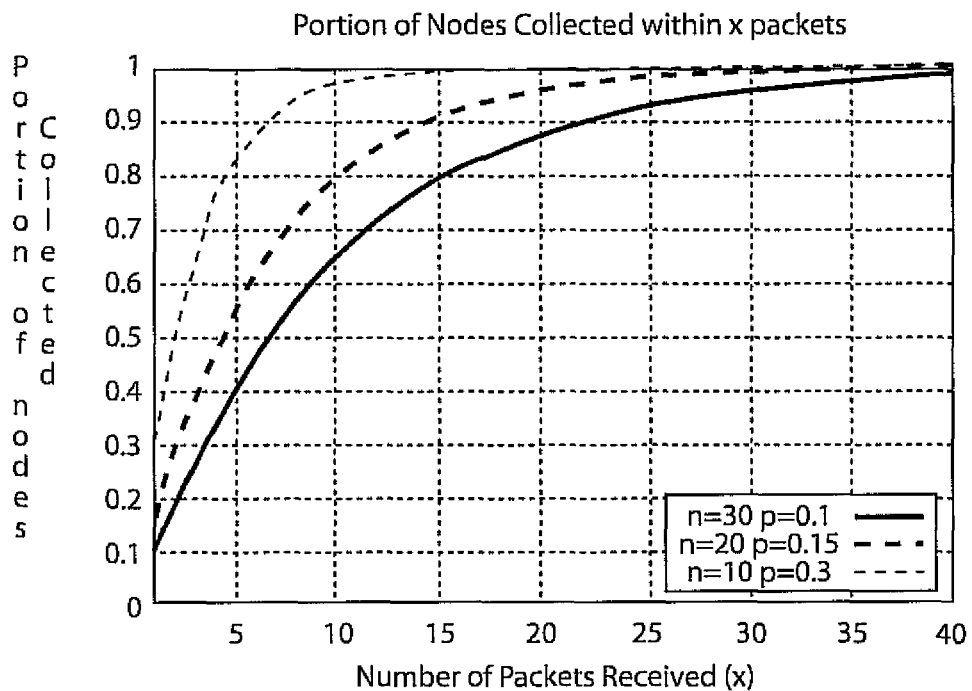
FIG. 11 is a graph showing average number of nodes whose marks are collected by a sink in the first x packets.

FIG. 11 shows the portion of nodes whose marks are collected by the sink after x packets. When there are 10 nodes, on average 9 nodes' marks can be received within 7 packets. For paths of 20, 30 nodes, it takes about 14, 22 packets to collect marks from 90% of the nodes. Within a few dozen packets, the sink knows which nodes are the forwarding nodes.

Figure 12:
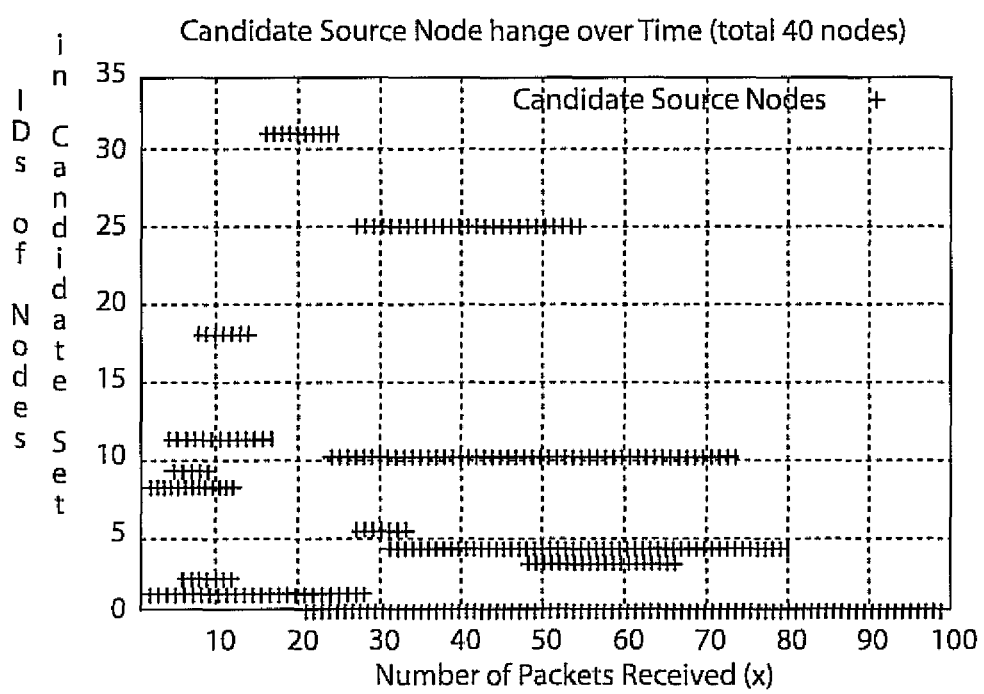
FIG. 12 is a graph showing candidate source set changes over time for a 40 node path.

Performance of the route reconstruction algorithm in probabilistic marking (method 1) was also evaluated. FIG. 12 shows how the candidate source set changes as more and more packets are received for a run of 40-node path, node 0 being the source mole. At first, node S is in the candidate list. As more marks are received, new nodes 8, 11, 9, 18 at the beginning of partial paths are added. As their upstream nodes are discovered later, they are removed from the list. The real source 0 is added on the 21th packet. After the 80th packet, no more candidate nodes other than 0 remain in the set. When the candidate set remains unchanged for a long time, the sink can unequivocally identify a mole.

Without sufficient numbers of packets, the sink may not be able to unequivocally reduce the candidate source set to only real moles. To test how many packets are needed, we changed the number of packets the sink receives as 200, 400, 600 and 800. For each traffic amount, we ran the simulation 100 times over each of 10 different path lengths from 5 to 50. We obtained how many times the sink does not unequivocally identify the source.

Figure 13:
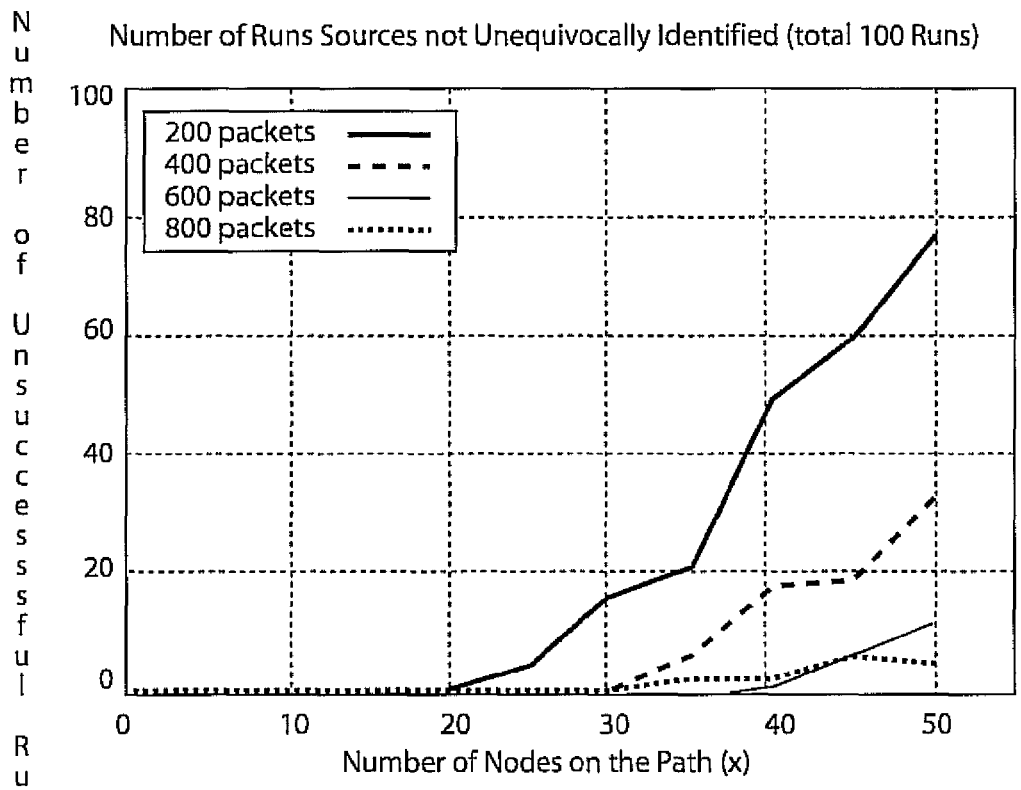
FIG. 13 is a graph showing, in 100 runs, how many runs fail to unequivocally identify the source as a function of total path length, where 200, 400, 600 and 800 curves correspond the number of packets in each run.

FIG. 13 illustrates the number of failed runs as a function of total path length, for the 4 different traffic amounts. We can see that 200 packets are sufficient for path lengths up to 20. The method 1 almost always unequivocally identifies the source in each run, 400 packets are enough for paths up to 30. Only for very long paths (e.g., 50 nodes), a large number of packets (e.g., 800) are needed to reduce the failure frequency to less than 5%.

Figure 14:
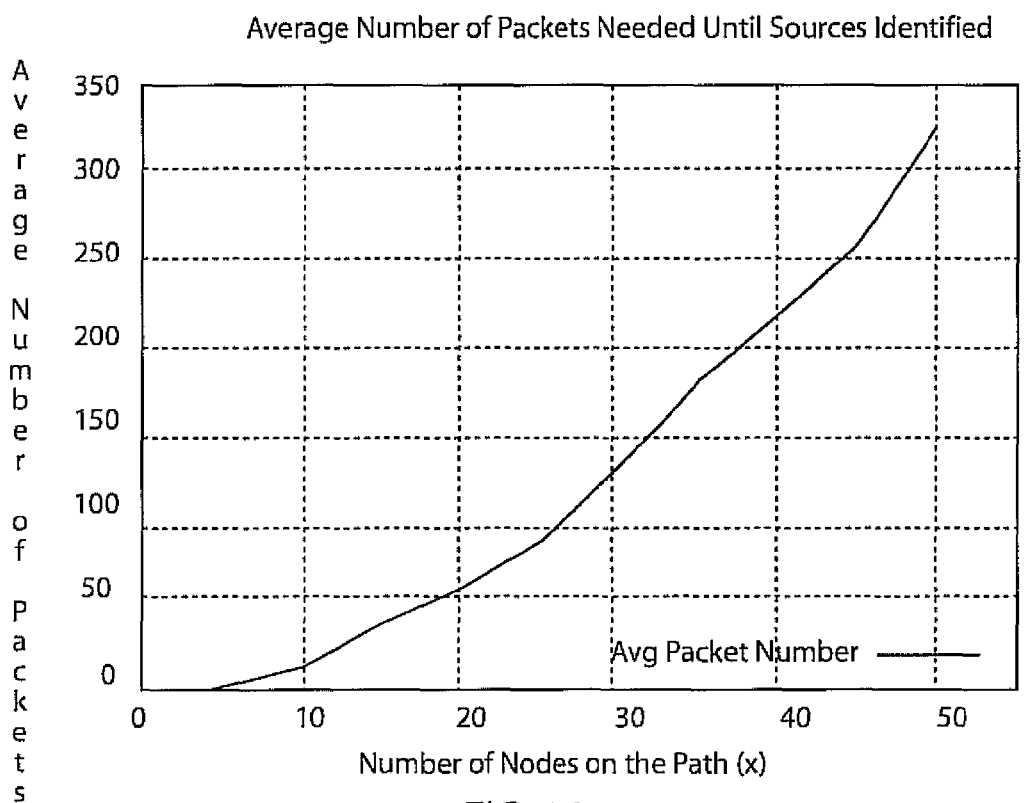
FIG. 14 is a graph showing the average number of packets needed to unequivocally identify the source as a function of total path length, where 800 packets are received at the sink in each run.

We chose 800 as the traffic amount to measure the average number of packets the sink should receive to unequivocally identify the source. FIG. 14 shows the results as a function of total path length, over all runs that successfully identify the source. For path lengths less than 20, on average it takes about 55 packets to unequivocally identify the source. This roughly matches the result in FIG. 10, where with 55 packets, the sink has over 99% probability of having collected marks from all the 20 nodes. Even for long paths such as 40 nodes, after about 220 packets the sink can unequivocally identify the source. The results demonstrate that PNM almost prevents moles from launching effective false data injection attacks: they will be located before they have caused sufficient damage to the network.

Traceback Precision: PNM can traceback moles to one-hop neighborhood, which includes a node and its one-hop neighbors. One of them is a mole, either a source, or a forwarding one. The precision is not single node because a source mole can claim different identities when injecting reports. Its next hop neighbor cannot tell which identity is true. PNM does not require pairwise keys between neighbors to work. However, the existence of pairwise keys may help improve the traceback precision.

PNM tracebacks one mole at a time. The expectation is that some mole isolation mechanism will work together with PNM. It isolates the mole identified in each round. Thus over time, these moles are isolated from the network one by one.

Impact of Routing Dynamics: The mole locating algorithm works well when the route is relatively stable. Since moles usually inject large amount of traffic in short time to maximize the damage, collecting sufficient packets does not need too much time. For example, if moles inject at maximum radio rate, within ten seconds the sink can collect about 300 packets, enough to locate moles 40 hops away. The route is very likely to remain stable during this short period of time.

Replay Reports: The source mole may replay reports with the same content multiple times, thus the mapping between real and anonymous IDs will stay fixed for each forwarding node. The colluding mole may accumulate such mappings over time, but such attacks can be easily thwarted by local suppression of redundant messages. A forwarding node can simply drop reports of the same content. This can be done by maintaining the signatures (e.g., a hash result) of the content (i.e., the event, location and timestamp) of recently seen messages and comparing those received against them.

The source mole may also replay legitimate reports from a real reporting source node. The report content still presents correct information. To detect and drop such messages, the same local suppression can be used. There are also other techniques. One of them is to make each node maintain an increasing sequence number for each message it sends or forwards; it includes the sequence number as part of the mark and protects it using the MAC. The sink can detect that replayed packets have the same sequence numbers. This technique has been explained above.

Because nodes use different keys, the anonymous IDs of two different nodes may collide (e.g., $H'_{ki}(M_u/i)=H'_{kj}(M_u/j)$) A cryptographically sound hash function can minimize such collisions; when they do happen, the sink can simply exclude such packets from verification. In PNM, moles can also inflict higher per packet overhead by inserting more bogus marks or using a higher probability than instructed. However, this causes only some reduction in efficiency; the sink can still traceback to them.

There may exist multiple source moles all sending attacking traffic. The basic nested marking, due to the marking of all forwarding nodes on the path, can still identify them. When the forwarding paths of these multiple source moles are disjoint, the PNM can construct different paths individually and locate the moles. These moles may also swap their identities to create loops, but the straight line linking the sink to these loops can still be used to identify these moles one at a time.

Figure 15:
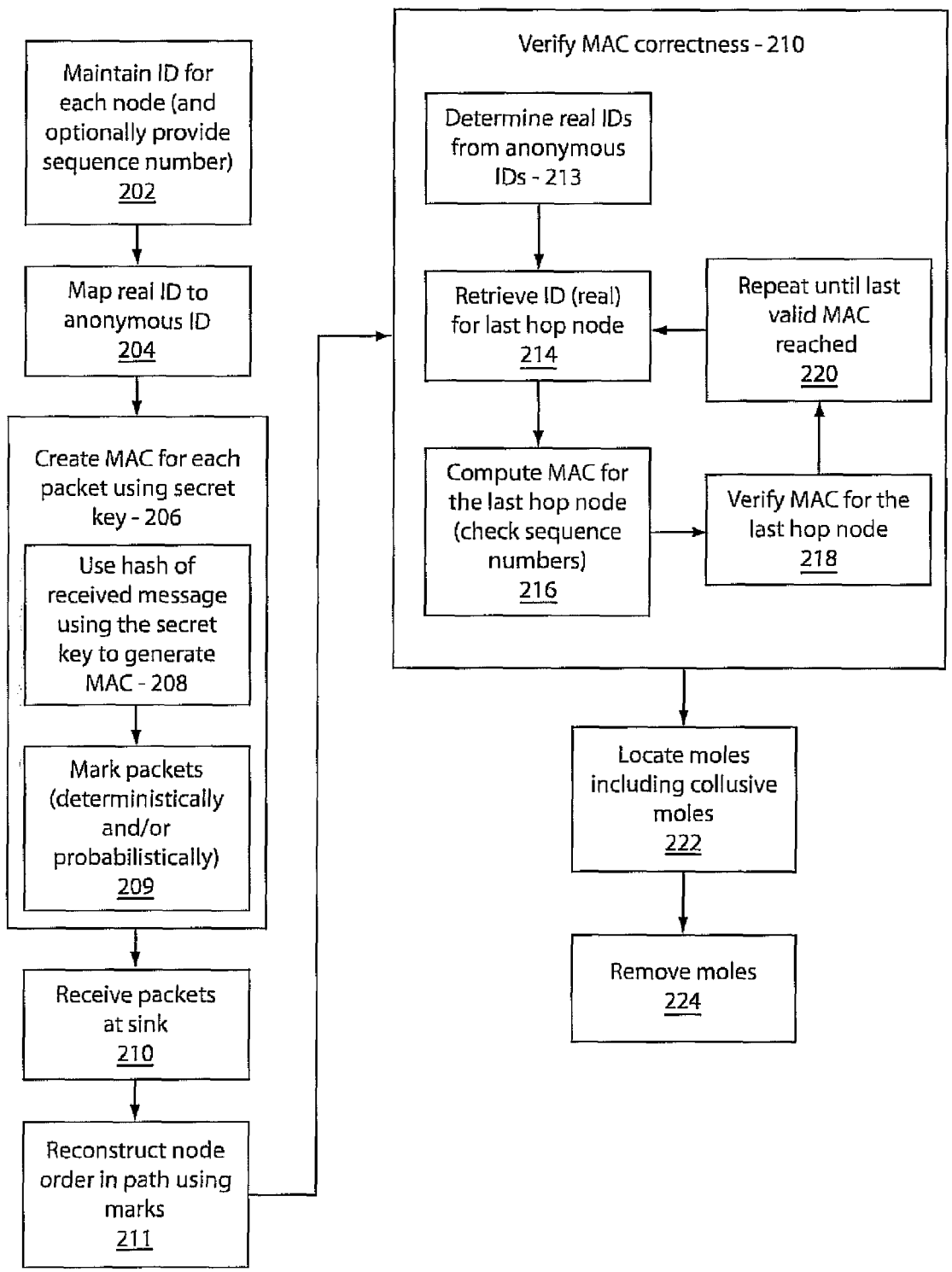
FIG. 15 is a block/flow diagram showing an illustrative system/method for traceback and mole location in accordance with an illustrative embodiment.

Referring to FIG. 15, a block/flow diagram depicts a system/method for traceback in wireless networks. In a network of nodes, each node is assigned and maintains an identity number (ID) (an optionally a sequence number as described above in FIG. 2) in block 202. In block 204, for one embodiment, the (real) ID is optionally mapped to an anonymous ID from the ID using a key known by a current node and the sink or by other means. The mapping of the anonymous ID includes using a current packet message to change the anonymous ID for each message forwarded. The mapping should use the packet's content, such that the mapping changes for each packet. This avoids a static mapping that can be accumulated by learned by attackers This is preferred in the PNM embodiment. In block 206, a secret key shared between the node and the sink is employed to compute or otherwise determine a signature, e.g., a message authentication code (MAC). A MAC is determined for each packet passing through the forwarding path. In block 208, the packet or message from a previous node may be hashed in accordance with the key to generate the MAC. The MAC may include a hashed version of a received message in a packet. The ID indicates a node's presence in the forwarding path and the MAC proves that the node sent the packet associated with the ID.

Packets are marked in block 209. The hashed version may be considered marking the packets, the marked packets are employed later on to provide a node order through the forwarding path. To reduce per-packet overhead, the marking can be done probabilistically at each forwarding node. Instead of always putting a mark in the packet, a forwarding node marks the packets with probability p. It adds its anonymous ID and MAC as usual. With probability 1−p, it does not do anything and simply forwards the packet to the next hop. The next hop uses the same probability p to decide whether it adds a mark, or simply continues passing the packet as is. Variants of marking may include basic deterministic marking, where every node puts a mark, and probabilistic marking, where every node puts a mark with certain probability.

In block 210, packets are received through a forwarding path at a sink. The sink reconstructs the order of the nodes based upon the marks for a sufficient number of packets in block 211.

Upon receiving each packet at the sink, the correctness of the MAC is verified back through each node of the forwarding path. A last valid MAC in the forwarding path is employed to determine a false data injection source or that the entire path is verified (e.g., no false injection sources). This may include retrieving an ID for a last hop node in block 214, computing the MAC for the last hop node in block 216, verifying the MAC of the last hop node in block 218; and repeating until the last valid MAC is determined in block 220. Blocks 216 and 218 may employ the sliding window described in FIG. 2 to verify the sequence number. In one embodiment, in block 213, the real IDs are determined from the anonymous IDs for nodes in the forwarding path (or all nodes) before verifying the MAC.

In block 222, the last valid MAC indicates the location of moles within one hop. In PMN, route reconstruction (see e.g., FIG. 5) may be performed to locate moles. The route reconstruction of FIG. 5 is not needed for the basic deterministic marking approach. Moles are located in the forwarding path and removed from the forwarding path in block 224. In particularly useful embodiments, the moles include a plurality of collusive moles in the forwarding path. These moles may be source nodes, or forwarding nodes and the types of attacks may include mark-insertion attacks, mark removal attacks, mark re-ordering attacks, mark altering attacks, selective dropping attacks, identity swapping attacks or any other attacks. Advantageously, moles can be located in accordance with the present principles within one hop of the mole.

Having described preferred embodiments of a system and method for resilient packet traceback in wireless mesh and sensor networks (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for packet traceback in a network, comprising:
maintaining an identity number (ID) for each forwarding node in a network, wherein each forwarding node includes a non-transitory computer readable storage medium for storing the ID;
generating a signature at each forwarding node using a secret key shared between the forwarding node and a sink;
marking each packet as each packet passes through each forwarding node in a forwarding path such that each added mark includes at least the ID and the signature of the node and protects all previously added marks;
upon receiving a packet at the sink, verifying correctness of the signatures as marked on each packet by the sink in reverse order in which the signatures were added; and
determining signature validity in the forwarding path to determine a location of a false data injection source, and/or a colluding compromised node.

2. The method as recited in claim 1, wherein the ID indicates the forwarding node's presence in the forwarding path and the signature proves that the forwarding node sent each packet associated with the ID.

3. The method as recited in claim 1, further comprising hashing each packet in its entirety from a previous forwarding node in accordance with the key to generate the signature.

4. The method as recited in claim 1, wherein determining signature validity includes retrieving an ID for a last hop forwarding node; computing the signature for the last hop forwarding node and verifying the signature of the last hop forwarding node; and repeating until the last valid signature is determined.

5. The method as recited in claim 1, wherein maintaining an identity number (ID) includes mapping an anonymous ID from the ID using a key known by a current forwarding node and the sink.

6. The method as recited in claim 5, wherein the mapping of the anonymous ID includes using a current packet message to change the anonymous ID for each message forwarded.

7. The method as recited in claim 6, wherein verifying includes determining the ID from the anonymous ID for forwarding nodes in the forwarding path.

8. The method as recited in claim 1, wherein marking packets provides a forwarding node order through the forwarding path.

9. The method as recited in claim 8, wherein marking packets includes marking packets probabilistically, with a probability, at each forwarding node.

10. The method as recited in claim 8, wherein marking packets includes deterministically marking packets at each forwarding node and providing an incremented sequence number for each packet.

11. The method as recited in claim 1, wherein verifying correctness of the signatures of each packet includes employing a sliding window of to determine valid sequence numbers.

12. The method as recited in claim 1, further comprising removing moles from the forwarding path.

13. The method as recited in claim 1, further comprising locating a plurality of collusive moles in the forwarding path.

14. The method as recited in claim 1, further comprising locating moles within one hop of the mole.

15. A computer program product for packet traceback in a network comprising a non-transitory computer readable storage medium including a computer readable program, wherein the computer readable program when executed on a computer causes the computer to perform the steps of:
maintaining an identity number (ID) for each forwarding node in a network;
generating a signature at each forwarding node using a secret key shared between the forwarding node and a sink;
marking each packet as each packet passes through each forwarding node in a forwarding path such that each added mark includes at least the ID and the signature of the forwarding node and protects all previously added marks;
upon receiving a packet at the sink, verifying correctness of the signatures as marked on each packet by the sink in reverse order in which the signatures were added; and
determining signature validity in the forwarding path to determine a false data injection source.

16. A method for packet traceback in a wireless mesh or sensor network, comprising:
maintaining a real identity number (ID) for each forwarding node in a network, wherein each forwarding node includes a non-transitory computer readable storage medium for storing the ID;
computing an anonymous ID from the real ID based on a secret key known only to a current forwarding node and a sink;
generating a message authentication code (MAC) using the secret key for each forwarding node in a forwarding path to mark each packet with at least two probabilities, wherein each packet is marked, said mark including at least the node's MAC, such that each mark added protects all previously added marks;
tracing back the path to discover false data injection sources by:
determining the real ID from the anonymous ID for nodes in the network;
reconstructing a node route using marks present in each packet; and
verifying correctness of the MAC of each packet back through each forwarding node of the forwarding path using the real ID and the secret key to determine a last valid MAC in the forwarding path.

17. The method as recited in claim 16, wherein the ID indicates a forwarding node's presence in the forwarding path and the MAC proves that the forwarding node sent the packet associated with the ID.

18. The method as recited in claim 16, further comprising hashing the packet from a previous forwarding node in accordance with the secret key to generate the MAC.

19. The method as recited in claim 16, wherein verifying correctness includes retrieving the real ID for a last hop forwarding node; computing the MAC for the last hop forwarding node and verifying the MAC of the last hop forwarding node; and repeating until the last valid MAC is determined.

20. The method as recited in claim 16, further comprising locating a plurality of collusive moles in the forwarding path; and removing the collusive moles.

21. The method as recited in claim 16, wherein locating moles is performed within one hop of the mole.

22. A computer program product for packet traceback in wireless mesh or sensor networks comprising a non-transitory computer readable storage medium including a computer readable program, wherein the computer readable program when executed on a computer causes the computer to perform the steps of:

maintaining a real identity number (ID) for each forwarding node in a network;

computing an anonymous ID from the real ID based on a secret key known only to a current forwarding node and a sink;

generating a message authentication code (MAC) using the secret key for each forwarding node in a forwarding path to mark each packet with at least two probabilities, wherein each packet is marked, said mark including at least the node's MAC, such that each mark added protects all previously added marks;

tracing back the path to discover false data injection sources by:

determining the real ID from the anonymous ID for forwarding nodes in the network;

reconstructing a node route using marks present in each packet; and verifying correctness of the MAC of each packet back through each forwarding node of the forwarding path using the real ID and the secret key to determine a last valid MAC in the forwarding path.

* * * * *